United States Patent Office 3,164,597
Patented Jan. 5, 1965

3,164,597
5-CARBOXYLIC ACID - 2 - PHENYL-PYRROLINES, CORRESPONDING PYRROLIDINES AND FUNCTIONAL DERIVATIVES THEREOF
Frederick Leonard, Yonkers, N.Y., assignor to Geigy Chemical Corporation, Greenburgh, N.Y., a corporation of Delaware
No Drawing. Filed Dec. 17, 1962, Ser. No. 244,903
14 Claims. (Cl. 260—268)

This invention relates to certain novel derivatives of pyrroline and pyrrolidine, which possess valuable pharmacological properties and are useful as pharmaceutical agents. This invention also pertains to processes for their manufacture.

More particularly, this invention resides in carboxy, carboalkoxy and carboxamido derivatives of phenylsubstituted pyrrolines and pyrrolidines which may, respectively, be represented by the following general formulae:

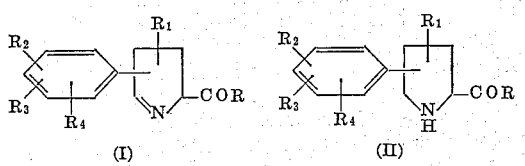

In these formulae:

R represents hydroxy, lower alkoxy, lower aralkoxy or amino or hydrazino or lower alkylamino, di(lower) alkylamino, or such heterocyclic radicals as pyrrolidyl, piperidyl, morpholinyl, piperazinyl, substituted piperazinyl, etc.;

$R_1$ is hydrogen or lower alkyl;

$R_2$, $R_3$ and $R_4$ denote hydrogen, halogen—preferably, chlorine and bromine, hydroxy, amino, lower alkyl, lower alkoxy, or lower alkylenedioxy, particularly, methylenedioxy and ethylenedioxy when two adjacent symbols R are joined together.

The term "lower alkyl" as used herein per se and as included in the term "lower alkoxy" means saturated monovalent aliphatic radicals of the general formula —$_{+1}C_mH_{2m}$ wherein $m$ designates an integer of less than six and is inclusive of both straight-chain and branched-chain radicals.

The compounds of this invention may be conveniently synthesized by a reaction involving the cyclization of an appropriate amino keto acid, generated in situ by hydrolysis of a di(lower) alkyl or di(lower)aralkyl acylamido-3-oxopropyl malonate, yielding the carboxy derivative of a substituted phenyl pyrroline which, if desired, can be readily converted to the corresponding ester and amide. The corresponding pyrrolidine derivatives can be obtained by reduction of the pyrroline derivatives.

More specifically, the subject compounds may be made by the following syntheses:

A. Pyrroline derivatives. Phenyl-substituted pyrroline-5-carboxylic acids are formed (1) by refluxing di(lower) alkyl or di(lower)aralkyl acylamido-3-oxopropyl malonates with mineral acid, such as, hydrohalic (hydrochloric or hydrobromic) or sulfuric acid. The treatment with mineral acid causes hydrolysis, cyclization and decarboxylation. These carboxy derivatives of pyrroline can be esterified (2) by any of the known esterification procedures, as for example, by refluxing with alkanol and sulfuric acid. The ester obtained, namely lower alkyl phenyl-substituted pyrroline-5-carboxylate, can be converted (3) to corresponding amides, i.e., phenyl-substituted pyrroline-5-carboxamides by a well known procedure which involves aminolysis.

The syntheses of these compounds may be graphically illustrated by the following equations:

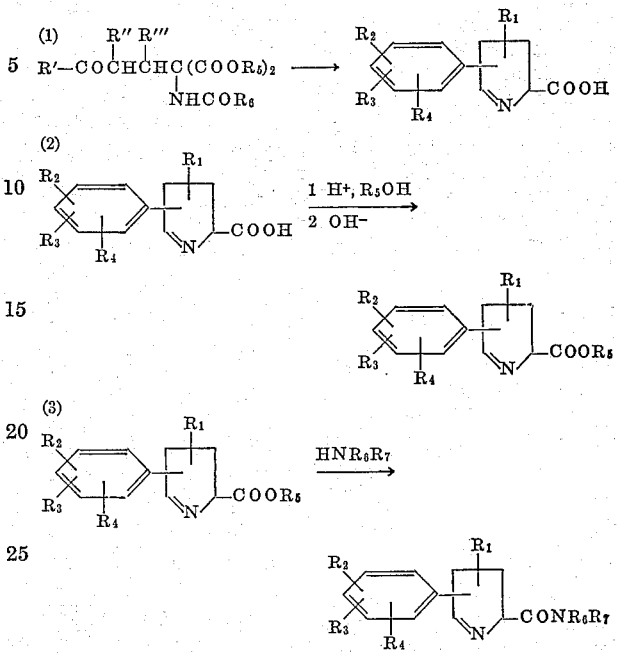

The symbols $R_1$, $R_2$, $R_3$, and $R_4$ in the above formulae have the significance ascribed to them hereinabove; and $NR_6R_7$ represents amino, hydrazino, lower alkylamino, di(lower)alkylamino or such heterocyclic radicals as pyrrolidyl, piperidyl, morpholinyl, piperazinyl or substituted piperazinyl, etc.; $R_5$ stands for lower alkyl or aralkyl; $R_6$ may be hydrogen, lower alkyl, aryl, or lower aralkoxy; and R', R" R''' denote hydrogen, lower alkyl or phenyl having substituents represented by $R_2$, $R_3$, and $R_4$, defined above provided that either R', R" or R''' is always hydrogen.

B. Pyrrolidine derivatives. The syntheses of phenyl-substituted pyrrolidine-2-carboxylic acids, -carboxylic acid esters and -carboxamides can be carried out by catalytic hydrogenation of the corresponding pyrroline compounds, as for example, in a Parr hydrogenator using platinum oxide or such other equivalent metal catalysts as palladium, rhodium, nickel, etc., at room temperatures or slightly elevated temperatures and at atmospheric or slightly above-atmospheric pressures. The preparative method of these compounds may be represented by the following equation:

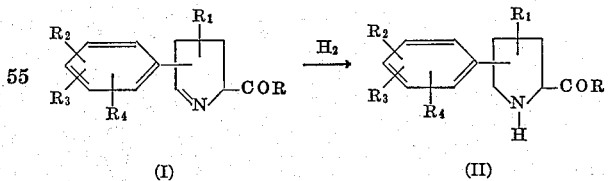

wherein R, $R_1$, $R_2$, $R_3$ and $R_4$ are as defined above.

In another aspect, this invention pertains to dicarbalkoxy and dicarboxamido derivatives of phenyl-substituted pyrrolines and pyrrolidines which may, respectively, be represented by the following general formulae:

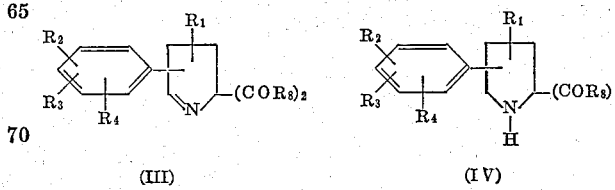

The symbols $R_1$, $R_2$, $R_3$ and $R_4$ in the above formulae are as defined hereinbefore and the $R_8$ represents lower alkoxy, lower aralkoxy, amino, hydrazino, lower alkylamino, di(lower) alkylamino or such heterocyclic radicals as pyrrolidyl, piperidyl, morpholinyl, piperazinyl, substituted piperazinyl, etc.

Phenyl-substituted pyrroline-5,5-dicarboxylic acid esters under Formula III are prepared by refluxing di(lower) alkyl benzyloxycarbamido-3-oxopropyl malonates (made in accordance with prior art methods) with mineral acid, such as, hydrohalic (hydrochloric or hydrobromic) or sulfuric acid. These diester derivatives can be converted to corresponding amides according to prior art methods involving aminolysis.

Compounds of Formula IV, i.e., the corresponding pyrrolidine derivatives can be obtained from compounds of Formula III by hydrogenation as described hereinbefore.

The starting material, namely di(lower) alkyl or dilower aralkyl acylamido-3-oxopropyl malonates can be synthesized from the corresponding acetophenones which are either commercially available or readily obtainable in accordance with standard procedures. For example, 3-hydroxy-4-methoxyacetophenone yields via a Mannich reaction with paraformaldehyde and dimethylamine hydrochloride, 3-dimethylamino-3'-hydroxy-4'-methoxypropiophenone hydrochloride. This affords desired starting material when condensed with diethyl acetamidomalonate.

The present invention comprehends not only the above-described derivatives of pyrroline and pyrrolidines in their free base form, but it also includes pharmaceutically acceptable non-toxic acid addition salts which may be formed from said compounds in accordance with conventional practice, by using appropriate inorganic and organic acids, such hydrohalic acids, especially hydrochloric and hydrobromic acids, sulfuric, methanesulfonic and phosphoric acids as well as acetic, aminoacetic, lactic, succinic, malic, aconitic, phthalic and tartaric acids.

As mentioned above, the subject compounds possess valuable pharmacological properties; they can be characterized as agents affecting the central nervous system and as antimetabolites.

More specifically, for instance, pharmacological screening has shown that these compounds produce decreased locomotor activity, muscular tone, grip strength and reflex as well as anti-convulsion and analgesia. They are thus useful as central depressant and/or neuromuscular blocking agents as well as anti-convulsant and analgesic agents.

Merely by way of illustration, the compound of Example 21, 2-(3,4-dimethoxyphenyl) pyrroline-5-carboxamide, which has an $LD_{50}$ of 1100 mg./kg. in mice i.p. produced for example decreased locomotor activity, muscular tone, grip strength and reflex in mice at a dose of 125 mg./kg. and at a dose of 250 mg./kg., sensitivity to touch is still exhibited in mice after three hours.

The compound of Example 24, 2-(3,4-methylene-dioxyphenyl)pyrroline-5-carboxamide, which has and $LD_{50}$, i.p. in mice of ca. 1500 mg./kg. exhibited a protective action against maximal electroshock seizures in mice. The onset of action was slow and protection reached a maximum (100%) 4–5 hours after injection of a dose of 100 mg./kg. i.p. With a dose of 50 mg./kg. i.p., or 100 mg./kg. p.o. 60% protection was obtained with a duration of action of over 6 hours. A dose of 100 mg./kg. protected 20% of the mice against metrazol convulsions and the i.v. dose of strychnine required to produce seizures was raised by 21%.

These new compounds and the methods for their preparation may be exemplified more fully by the following illustrative examples. The temperatures therein are given in degrees centigrade.

A. PYRROLINE DERIVATIVES

Example 1.—2-Phenylpyrroline-5-Carboxylic Acid Hydrochloride (a) 3-dimethylaminopropiophenone hydrochloride was prepared in ca. 65% yield from acetophenone by the method of C. E. Maxwell, Organic Synth., Coll. vol. III, p. 305 (M.P. 155–157°).

(b) Diethyl acetamido-(3-phenyl-3-oxopropyl) - malonate: 3-dimethylaminopropiophenone hydrochloride (40.0 g., 0.2 mole) was suspended in 100 ml. of absolute ethanol, and 33.0 g. (0.24 mole) of dimethyl sulfate was added dropwise. The reaction was allowed to proceed at room temperature for one half hour with continuous stirring. Subsequent addition of 35.0 g. (0.16 mole) of diethyl acetamidomalonate suspended in sodium ethoxide solution (prepared by dissolving 0.32 mole of sodium in 125 ml. of absolute alcohol) resulted in a slightly exothermic reaction. The mixture was heated under reflux for five hours, allowed to cool to room temperature and added to 500 g. of chipped ice. The desired compound (49.0 g., M.P. 111–113°) crystallized. Recrystallization from isopropanol yielded 44.0 g. thereof (M.P. 116–118°).

(c) 2-phenylpyrroline-5-carboxylic acid hydrochloride: A mixture of diethyl acetamido-(3-phenyl-3-oxopropyl)-malonate (30 g., 0.085 mole) and 130 ml. of 6N hydrochloric acid was heated under reflux for eighteen hours. The resulting solution was filtered and evaporated to dryness under reduced pressure. The oily residue was refluxed with 150 ml. of acetone. After prolonged standing at room temperature, 16.7 g. of the desired compound crystallized; M.P. 174–175° (dec.).

Example 2.—Ethyl 2-Phenylpyrroline-5-Carboxylate 2-phenylpyrroline-5-carboxylic acid hydrochloride (45 g.) was dissolved in 450 ml. of 2B ethanol (dried by distillation over $CaH_2$), 45 ml. sulfuric acid (reagent grade) was added and the mixture was heated under reflux (anhydrous conditions) for three hours. Ethanol was then removed by distillation under reduced pressure and the remaining product was treated with saturated sodium carbonate solution (to pH 9) and extracted with chloroform (3 x 300 ml., 2 x 100 ml.). The combined chloroform extract was dried over sodium sulfate and the solvent removed by distillation under reduced pressure (60°, water aspirator). Further distillation under vacuum yielded 35.6 g. (82%) of a product having a B.P. of 129–131°/0.5 mm. Three redistillations yielded the desired compound; B.P. 128–130°/0.4 mm., $n_D^{25}$ 1.5436.

Example 3.—2-Phenylpyrroline-5-Carboxamide

Ethyl 2-phenylpyrroline-5-carboxylate (10 g.) was dissolved in 100 ml. of methanol. The solution was placed in a pressure bottle, cooled to 0°, and saturated with anhydrous ammonia. The sealed pressure bottle was stored at room temperature for three days, after which period the solution was resaturated with ammonia. After reaction for an additional week, at room temperature, the methanolic solution was evaporated to dryness and the residue was recrystallized from 100 ml. of isopropanol to give 6.8 g. of the reaction product (78%); M.P. 152–154°. One additional recrystallization yielded 5.16 g. (M.P. 152–153°) of the desired product.

Infrared spectrum: $CHCl_3$ solution—2.88, 2.98, 5.95, 6.20, 6.40μ.
Ultraviolet spectrum:

$$\lambda_{max}^{MeOH}\ 245m\mu;\ \epsilon,\ 1.5 \times 10^4$$

Example 4.—2-(4-Hydroxyphenyl)Pyrroline-5-Carboxylic Acid Hydrochloride (a) 3-dimethylamino-4'-hydroxypropiophenone hydrochloride was prepared in ca. 60% yield from 4-hydroxyacetophenone by the method of Knott, J. Chem. Soc., 1190 (1947); M.P. 202–204° (Lit. 192°).

(b) Diethyl acetamido - [3-(4-hydroxyphenyl)-3-oxopropyl] - malonate: 3 - dimethylamino - 4' - hydroxypropiophenone hydrochloride (34.5 g., 0.15 mole) was suspended in 125 ml. of anhydrous ethanol (dried by distillation over $CaH_2$), and 19.0 g. (0.15 mole) of dimethyl sulfate was added dropwise at room temperature. Reaction was allowed to proceed at room temperature for three hours with continuous stirring. Subsequent addition of 29.5 g. (0.135 mole) of diethyl acetamidomalonate, suspended in sodium ethoxide solution (prepared by dissolving 0.45 mole of sodium in 175 ml. of anhydrous ethanol), resulted in a slightly exothermic reaction. The mixture was allowed to react at room temperature for one hour and was then heated under reflux for an additional hour. After cooling and storage at room temperature for an additional 18 hours, the reaction mixture was added to 1000 g. of chipped ice. Neutralization of the solution to pH 5 with 5% hydrochloric acid led to crystallization of the desired product in 81% yield (40.0 g., M.P. 169–171.5°). Recrystallization from isopropanol did not raise the melting point.

(c) 2-(4-hydroxyphenyl)pyrroline - 5 - carboxylic acid hydrochloride: The compound obtained under (b) above (15 g., 0.04 mole) was added to 175 ml. of 6 N hydrochloric acid and the suspension was heated under reflux for four hours. The resulting solution was filtered and evaporated to dryness under reduced pressure; the residue was further dried by distillation with benzene. Acetone (150 ml.) was added to the residue and crystallization occurred. The reaction product (10.3 g., 0.04 mole, M.P. 138–142°) was recrystallized three times from 80 ml. of acetone-water (10:1) and dried at 80° under reduced pressure to give the desired compound; M.P. 214–217° (dec.).

Infrared spectrum: (KBr pellet)—2.85, 2.95, 5.80, 6.12, 6.25, 6.58$\mu$.

Ultraviolet spectrum:

$$\lambda_{max.}^{MeOH} \ 313m\mu, \ 231m\mu; \ \lambda_{max.}^{0.1N \ NaOH} \ 300m\mu, \ 218m\mu$$

Example 5.—Ethyl 2-(4-Hydroxyphenyl)Pyrroline-5-Carboxylate 2-(4-hydroxyphenyl)pyrroline-5-carboxylic acid hydrochloride (22.25 g., 0.09 mole) was dissolved in 100 ml. of absolute ethanol (dried by distillation over $CaH_2$). Sulfuric acid (reagent grade, 45 ml.) was added and the mixture was heated under reflux for 3 hours. Ethanol was removed by distillation under reduced pressure and the remaining mixture was treated with saturated sodium carbonate solution (to pH 7). The aqueous suspension was extracted with chloroform (3 x 200 ml.). The combined chloroform extracts were dried over sodium sulfate and then evaporated to dryness. The crystalline residue (18.0 g., M.P. 138–140°) yielded after two recrystallizations from isopropanolisopropyl ether (1:1, 50 ml.), 11.5 g. of the desired material; M.P. 141–143°. Infrared spectrum: 2.95$\mu$, 5.76$\mu$, 6.20$\mu$, 6.32$\mu$, 6.58$\mu$.

Ultraviolet spectrum:

$$\lambda_{max.}^{MeOH} \ 268 \ m\mu, \ \epsilon, \ 1.8 \times 10^4$$

Example 6.—2-(4-Hydroxyphenyl)Pyrroline-5-Carboxamide

Ethyl 2 - (4 - hydroxyphenyl)pyrroline-5-carboxylate (11.6 g., 0.05 mole) was dissolved in 100 ml. of 2B ethanol. The solution was placed in a pressure bottle, cooled to 0°, and saturated with anhydrous ammonia. The sealed pressure bottle was stored at room temperature for four days, the solution was then saturated with ammonia and stored at room temperature for three additional days. A reaction product crystallized on standing. First crop: 6.5 g., M.P. 238–239° dec.; second crop: 2.0 g., M.P. 240–244° dec. Recrystallization from 400 ml. of methanol yielded 5.9 g. of the desired compound; M.P. 245–247°.

Ultraviolet spectrum:

$$\lambda_{max.}^{MeOH} \ 268 \ m\mu; \ \epsilon, \ 1.8 \times 10^4$$

Example 7.—Methyl 2-(4-Hydroxyphenyl)Pyrroline-5-Carboxylate

A solution of 4.66 g. (0.02 mole) of ethyl 2-(4-hydroxyphenyl)pyrroline-5-carboxylate in methanol was saturated with anhydrous ammonia at 0°. The solution was stored in a pressure bottle at room temperature for three days, was then resaturated with ammonia and kept at room temperature for five additional days. The solution was concentrated under reduced pressure (to ca. 10 ml.). The reaction product (3.6 g.; M.P. 190–194°) crystallized. Three recrystallizations from isopropanol yielded the desired compound (1.3 g., M.P. 198–200°).

Ultraviolet spectrum:

$$\lambda_{max.}^{MeOH} \ 270 \ m\mu, \ \epsilon, \ 1.8 \times 10^4$$

Example 8.—Ethyl 2-(4-Chlorophenyl)Pyrroline 5-Carboxylate (a) 3 - dimethylamino-4'-chloropropiophenone hydrochloride was prepared in ca. 60% yield from 4-chloroacetophenone by the method of Nobles and Burckhalter, J. Am. Pharm. Assoc., 47, 77 (1958); M.P. 175–176° (Lit. 176°).

(b) Diethyl acetamido - [3 - (4-chlorophenyl)-3-oxopropyl]-malonate: 3-dimethylamino-4'-chloropropiophenone hydrochloride (58.5 g., 0.25 mole) was suspended in 200 ml. of anhydrous ethanol (dried by distillation over $CaH_2$). The mixture was heated to effect solution and then cooled while stirring to obtain a fine crystalline slurry. Dimethyl sulfate (0.3 mole, 37.8 g.) was added dropwise at room temperature and reaction was allowed to proceed at room temperature for three hours with continuous stirring to give a clear solution. Subsequent addition of 8.8 g. (0.225 mole) of diethyl acetamidomalonate, suspended in sodium ethoxide solution (prepared by dissolving 0.45 mole of sodium in 250 ml. of anhydrous ethanol), resulted in a slightly exothermic reaction. The mixture was allowed to react at room temperature for 15 minutes and was then heated under reflux for one hour. After cooling, 1000 g. of ice was gradually added to the reaction mixture. The reaction product crystallized immediately (74.2 g., M.P. 105–107°) in 84% yield. Recrystallization from isopropanol (150 ml.) yielded the desired compound 58.5 g., M.P. 113–115° in 68% yield. Two further recrystallizations from isopropanol raised the M.P. slightly to 114.5–115.5°.

(c) Ethyl 2-(4-chlorophenyl)pyrroline-5-carboxylate: The compound obtained under (b) above (38.3 g., 0.1 mole) was added to 150 ml. of 6 N hydrochloric acid and the suspension was heated under reflux for three hours. The resulting solution was filtered and evaporated to dryness under reduced pressure; the residue )was further dried by distillation with benzene. The crude gelatinous product was dissolved in 200 ml. of anhydrous ethanol. Sulfuric acid (reagent grade, 20 ml.) was added and the mixture was heated under reflux (anhydrous conditions) for three hours. Ethanol was then removed by distillation under reduced pressure and the remaining product was treated with saturated sodium carbonate solution (to pH 9). The aqueous suspension was extracted with chloroform (4 x 100 ml.). The chloroform solution was dried over sodium sulfate and the solvent was removed under reduced pressure. Further distillation under high vacuum yielded a product having a B.P. of 155–159°/0.8 mm. and M.P. of 34–35°. Redistillation gave the desired compound (14 g., B.P. 161–162°/1.2 mm. M.P. 33–35°) in 55% yield. The colorless sample became yellowish on standing.

Infrared spectrum: 5.80, 6.20, 6.26, 6.40, 6.70$\mu$ ($CHCl_3$ solution)

$$\lambda_{max.}^{MeOH} \ 252 \ m\mu, \ 238 \ m\mu$$

Example 9.—2-(4-Chlorophenyl)Pyrroline-5-Carboxamide

Ethyl 2-(4-chlorophenyl)pyrroline-5-carboxylate (25.2 g. 0.1 mole) was dissolved in 140 ml. of methanol. The solution was saturated with anhydrous ammonia in a pressure bottle at ice bath temperature. The sealed pressure bottle was stored at room temperature for three (3) days, after which period the solution was resaturated with ammonia. After reaction for five (5) additional days at room temperature, 21.5 g. of the reaction product crystallized (M.P. 176–179°). Recrystallization from 200 ml. of methanol yielded 17.8 g. of the desired compound; M.P. 176–178°.

Infrared spectrum: (KBr) 6.02, 6.18, 6.25μ
Ultraviolet spectrum:

$$\lambda_{max.}^{MeOH}\ 250\ m\mu;\ \epsilon,\ 1.8 \times 10^4$$

Example 10.—Ethyl 2-(4-Methoxyphenyl)Pyrroline-5-Carboxylate (a) 3-dimethylamino-4'-methoxypropiophenone hydrochloride was prepared in ca. 75% yield from 4-methoxyacetophenone by the method of Nobles and Burckhalter, J. Am. Pharm. Assoc., 47, 77 (1958); M.P. 185–186° (Lit. 181°).

(b) Diethyl acetamido-[3-(4-methoxyphenyl)-3-oxopropyl]-malonate: The compound obtained under (a) above (146 g., 0.6 mole was suspended in 500 ml. of anhydrous ethanol (dried by distillation over $CaH_2$), and 91 g. (0.72 mole) of dimethyl sulfate was added dropwise at room temperature. Reaction was allowed to proceed at room temperature for three (3) hours with continuous stirring. Subsequent addition of 128 g. (0.6 mole) of diethyl acetamidomalonate suspended in sodium ethoxide solution (prepared by dissolving 1.2 moles of sodium in 500 ml. of anhydrous ethanol) resulted in a slightly exothermic reaction. The mixture was allowed to react at room temperature with continuous stirring for one hour and was then heated under reflux for two hours. After cooling to room temperature, the reaction mixture was added to 2000 g. of chipped ice. The product (202 g., M.P. 92–95°) crystallized in 87% yield. Four recrystallizations from isopropanol yielded analytical sample (M.P. 93–95°).

(c) 2-(4-methoxyphenyl)pyrroline-5-carboxylic acid hydrochloride: The diethyl acetamidomalonate of (b) above (256 g. 0.67 mole) was added to 1250 ml. of 6 N hydrochloric acid and the suspension was heated under reflux for four hours. The resulting solution was filtered and evaporated to dryness under reduced pressure; the residue was further dried by distillation with benzene and acetone. Acetone (500 ml.) was added to the remaining oil which crystallized upon standing for two days to yield 116.5 g. of reaction product (M.P. 130–134°) in 97% yield.

(d) Ethyl 2-(4-methoxyphenyl)pyrroline-5-carboxylate. The compound obtained under (c) above (25.6 g., 0.1 mole) was dissolved in 200 ml. of 2B ethanol (dried by distillation over $CaH_2$), 20 ml. sulfuric acid (reagent grade) was added and the mixture was heated under reflux (anhydrous conditions) for three hours. Ethanol was then removed by distillation under reduced pressure, and the remaining product was treated in the cold with saturated sodium carbonate solution (to pH 9). The aqueous mixture was extracted with chloroform (3 x 100 ml.). The combined chloroform extract was dried over sodium sulfate, and the solvent was removed under reduced pressure. The oily residue crystallized to 22.1 g. of product (M.P. 50–52°) on standing in the refrigerator. A 10 g. portion of the product was recrystallized twice from 100 ml. of n-hexane and once from 50 ml. of cyclohexane to yield 5.3 g. of the desired compound (M.P. 59–60°).

Ultraviolet spectrum:

$$\lambda_{max.}^{MeOH}\ 268\ m\mu;\ \epsilon,\ 1.9 \times 10^4$$

Example 11.—2-(4-Methoxyphenyl)Pyrroline-5-Carboxamide

Ethyl 2-(4-methoxyphenyl)pyrroline-5-carboxylate (12.36 g., of 0.05 mole) was dissolved in 100 ml. of ethanol 2B. The solution, placed in a pressure bottle and cooled to 0°, was saturated with anhydrous ammonia. The sealed pressure bottle was stored at room temperature for three days, the solution was then resaturated with ammonia and stored at room temperature for three additional days. On standing, 3.8 g. of a reaction product (M.P. 174–177°) crystallized. Resaturation of the mother liquor with ammonia, storage at room temperature for two additional days and concentration of the solution yielded 3.0 g. of additional product; M. P. 177–179° (dec.). Recrystallization from ca. 125 ml. methanol yielded 5.2 g. of the desired compound; M.P. 178–179° (dec.).

Ultraviolet spectrum:

$$\lambda_{max.}^{MeOH}\ 265\ m\mu;\ \epsilon,\ 1.7 \times 10^4$$

Example 12.—Methyl 2-(4-Methoxyphenyl)Pyrroline-5-Caboxylate

Ethyl 2-(4-methoxyphenyl)pyrroline-5-carboxylate (11.1 g., 0.045 mole) was dissolved in methanol (100 ml.) and the solution was saturated with ammonia at ice bath temperature. After a reaction period of two days at room temperature in pressure bottle, the solution was resaturated with ammonia. After storage at room temperature for five additional days, the solution was evaporated to dryness, yielding a crystalline residue. Isopropanol (100 ml.) was added and the reaction product (7.9 g., M.P. 100–102°) was collected. Two recrystallizations from isopropanol yielded 4.8 g. of the desired compound; M.P. 104–106°.

Infrared spectrum: 5.76, 6.21, 6.35μ
Ultraviolet spectrum:

$$\lambda_{max.}^{MeOH}\ 265\ m\mu;\ \epsilon,\ 2.0 \times 10^4$$

Example 13.—Ethyl 2-(4-Aminophenyl)Pyrroline-5-Carboxylate (a) 3-dimethylamino-4'-nitropropiophenone hydrochloride [L. W. Nobles and J. R. Burckhalter, J. Am. Pharm. Assoc. 47, 77, (1958), M.P. 191°] was prepared by the general procedure for the preparation of ketonic Mannich bases (C. E. Marshall, Org. Synth., Coll. vol. 3, p. 305) in ca. 60% yield; M.P. 187–188°.

(b) Diethyl acetamido-[3-(4-nitrophenyl)-3-oxopropyl]-malonate: The compound obtained under (a) above (93.0 g., 0.36 mole) was suspended in 300 ml. of absolute ethanol. Dimethyl sulfate (54.5 g., 0.43 mole) was added dropwise and the mixture was allowed to react at room temperature for two hours with stirring. A suspension of 70.8 g. (0.32 mole) diethyl acetamido malonate in sodium ethoxide solution (prepared by dissolving 0.54 mole of sodium in 300 ml. of absolute ethanol) was then added portionwise with continuous stirring to avoid brown discoloration. The mixture was allowed to react at room temperature for one hour, was then heated under reflux for one additional hour and was stirred overnight at room temperature. The reaction mixture was then added to ice (2000 g.) the pH of the solution was adjusted to 5 with dilute hydrochloric acid. The reaction product (134 g.; M.P. 145–146°) crystallized and was recrystallized from 300 ml. of ethanol to yield a yellow compound (111 g.; M.P. 146–147°).

(c) Dimethyl acetamido-[3-(4-aminophenyl)-3-oxopropyl]-malonate: The compound synthesized in accordance with process step (b) above (12.4 g., 0.033 mole) was suspended in 200 ml. of ethanol. Palladium on charcoal (5%, 0.5 g.) was added and the mixture was hydrogenated at room temperature and 3 atm. pressure. The amount of hydrogen necessary for the reduction of the nitro group was consumed within three hours. The catalyst was removed by filtration and the solution was evaporated to dryness under reduced pressure. The residue (11.1 g.) was recrystallized from 50 ml. of isopropanol to yield 8.8 g. of the desired product; M.P. 122–123.5°.

(d) Ethyl 2 - (4 - aminophenyl)pyrroline - 5 - carboxylate: The malonate identified under (c) above (29.2 g., 0.08 mole) was added to 150 ml. of 6 N hydrochloric acid and the suspension was heated under reflux for three hours. The resulting solution was filtered and evaporated to dryness under reduced pressure. The residue was further dried by distillation with benzene. The crude product was dissolved in 300 ml. of absolute ethanol. Sulfuric acid (reagent grade, 30 ml.) was added and the mixture was heated under reflux for three hours. Ethanol was removed by distillation under reduced pressure and the remaining product was treated in an ice bath with saturated sodium carbonate solution (to pH 8). The suspension was extracted with chloroform (3 x 150 ml.). The chloroform extract was dried over sodium sulfate and the solvent was removed under reduced pressure. The product obtained (oil, 20.3 g.) was dissolved in 100 ml. of isopropanol, the solution was treated with charcoal and reduced in volume to 30 ml. The desired compound (19.9 g.; M.P. 111–113°) that crystallized on standing was twice recrystallized from isopropanol to give 12.5 g. of a screening sample; M.P. 112–114°.

Ultraviolet spectrum:

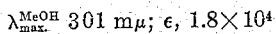

*Example 14.—2-(4-Aminophenyl)Pyrroline-5-Carboxamide*

Ethyl 2 - (4 - aminophenyl)pyrroline - 5 - carboxylate (7.0 g., 0.03 mole) was dissolved in 100 ml. of ethanol. The solution was saturated with anhydrous ammonia in a pressure bottle at ice bath temperature. The solution was stored at room temperature for five days, was then resaturated with ammonia and stored at room temperature for three additional days. The crystalline reaction product (3.3 g.; M.P. 210–217° dec.) was removed by filtration, and recrystallized twice from methanol to yield 2.1 g. of the desired compound; M.P. 220–222° (dec.).

*Example 15.—2-(3,4-Dimethoxyphenyl)Pyrroline-5-Carboxylic Acid Hydrochloride*

(a) 3,4-dimethoxyacetophenone was prepared in ca. 80% yield from acetovanillone by the method of Blicke and Johnson, J. Am. Pharm. Assoc. 45, 440 (1956); M.P. 51–52°, as reported.

(b) 3-dimethylamino - 3',4' - dimethoxypropiophenone hydrochloride was prepared from 3,4-dimethoxyacetophenone in ca. 65% yield as described by Mannich and Lammering, Ber. 55, 3518 (1922); M.P. 180–182°, as reported.

(c) Diethyl acetamido - [3-(3,4-dimethoxyphenyl)-3-oxopropyl]-malonate: 3 - dimethylamino-3',4'-dimethoxypropiophenone hydrochloride (49.2 g., 0.18 mole) was suspended in 150 ml. of anhydrous ethanol (dried by distillation over CaH₂), and 27.3 g. (0.22 mole) of dimethyl sulfate was added dropwise at room temperature. The reaction was allowed to proceed at room temperature for three hours with continuous stirring. Subsequent addition of 35.4 g. (0.16 mole) of diethyl acetamidomalonate, suspended in sodium ethoxide solution (prepared by dissolving 0.36 mole of sodium in 150 ml. of anhydrous ethanol), resulted in slightly exothermic reaction. The mixture was allowed to react at room temperature for one hour and was then heated under reflux for an additional hour. After cooling, the reaction mixture was added to 1000 g. of chipped ice. The desired product crystallized (59.5 g., M.P. 106–108°) in 89% yield. Recrystallization from isopropanol raised the M.P. to 107–109°.

(d) 2-(3,4-dimethoxyphenyl)pyrroline - 5 - carboxylic acid hydrochloride: The compound obtained under (c) above (35.0 g., 0.086 mole) was added to 175 ml. of 6 N hydrochloric acid and the suspension was heated under reflux for three hours. The resulting solution was filtered and evaporated to dryness under reduced pressure; the residue was further dried by distillation with benzene. Acetone (150 ml.) was added to the residue and crystallization occurred. The reaction product (25.1 g., 0.085 mole, M.P. 220–223° dec.) was recrystallized twice from 250 ml. of acetone-water (4:1) and dried to give 16.8 g. of the desired compound; M.P. 215–216° (dec.).

Infrared spectrum: (KBr pellet) 5.72, 6.12, 6.25, 6.57, 7.80μ

Ultraviolet spectrum:

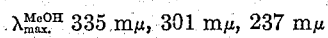

*Example 16.—Methyl 2-(3,4-Dimethoxyphenyl)Pyrroline-5-Carboxylate*

2-(3,4-dimethoxyphenyl)pyrroline - 5 - carboxylic acid hydrochloride (34.3 g., 0.12 mole) was dissolved in 300 ml. of absolute methanol. Sulfuric acid (reagent grade, 30 ml.) was added and the mixture was heated under reflux for three hours. Methanol was then removed by distillation under reduced pressure and the remaining product was treated with saturated sodium carbonate solution (to pH 9) and extracted with chloroform (3 x 100 ml.). The combined chloroform extract was washed with water, dried over sodium sulfate and evaporated to dryness under reduced pressure. The oily residue was dissolved in isopropanol (50 ml.) and the product (22.8 g., M.P. 78–81°) crystallized. Recrystallizaiton of 5 g. portion from isopropanol (10 ml.) yielded 3.3 g. of the desired compound; M.P. 79–81°.

Ultraviolet spectrum:

$\lambda_{max.}^{MeOH}$ 299 mμ (ε, 9,000); 270 mμ (ε, 15,000); 226 mμ (ε, 16,000)

*Example 17.—1-[2-(3,4-Dimethoxyphenyl)Pyrroline-5-Carbonyl]Piperidine*

A solution of methyl 2-(3,4-dimethoxyphenyl)pyrroline-5-carboxylate (8.4 g., 0.032 mole) in 50 ml. of piperidine was heated under reflux for 24 hours. The solvent was removed under reduced pressure, the oily colored residue was dissolved in chloroform (50 ml.). The chloroform solution was first washed with water and then extracted with 5% HCl (3 x 50 ml.). The acid aqueous solution was neutralized (to pH 9) with saturated sodium carbonate solution and extracted with chloroform. The chloroform extract was washed with water, dried over sodium sulfate and evaporated to dryness. The residue was dissolved in boiling isopropyl ether (50 ml.), the solution was treated with charcoal and allowed to cool. Oil formed, but crystallized on standing at room temperature overnight; yield of product 4.0 g., M.P. 71–73°. Recrystallization from isopropyl ether yielded 3.5 g. of the desired compound; M.P. 71–73°.

Ultraviolet spectrum:

$\lambda_{max.}^{MeOH}$ 295 mμ (ε, 8,700); 267 mμ (ε, 15,000)

*Example 18.—4-[2-(3,4-Dimethoxyphenyl)Pyrroline-5-Carbonyl]Morpholine*

A solution of methyl 2-(3,4-dimethoxyphenyl)pyrroline-5-carboxylate (8.3 g., 0.032 mole) in 50 ml. of morpholine was heated under reflux for 24 hours. The solvent was removed under pressure, and the oily residue was crystallized from 20 ml. of isopropanol to yield 8.0 g. of product; M.P. 107–110°. Two recrystallizations from isopropanol gave 5.5 g. of the desired compound; M.P. 107–109°.

Ultraviolet spectrum:

$\lambda_{max.}^{MeOH}$ 295 m$\mu$ ($\epsilon$, 8,600); 266 m$\mu$ ($\epsilon$, 15,000).

*Example 19.—Ethyl 2-(3,4-Dimethoxphenyl)Pyrroline-5-Carboxylate*

2-(3,4-dimethoxyphenyl)pyrroline - 5-carboxylic acid hydrochloride (5.72 g., 0.02 mole) was dissolved in 50 ml. of absolute 2B ethanol. Sulfuric acid (reagent grade, 5 ml.) was added and the mixture was heated under reflux for three hours. Ethanol was then removed by distillation under reduced pressure and the remaining product was treated with saturated sodium carbonate solution (to pH 8) and extracted with chloroform (3 x 100 ml.). The combined chloroform extract was washed with water, dried over sodium sulfate and the solvent was removed by distillation under reduced pressure. Addition of isopropyl ether to the oily residue yielded a crystalline product (4.9 g.; M.P. 90–91°). Recrystallization from 100 ml. of isopropyl ether followed by two recrystallizations from cyclohexane yielded 3.6 g. of the desired compound; M.P. 88–89°.

Ultraviolet spectrum:

$\lambda_{max.}^{MeOH}$ 226 m$\mu$ ($\epsilon$, 16,00); 270 m$\mu$ ($\epsilon$, 15,00); 298 m$\mu$ ($\epsilon$ 10,000)

*Example 20.—2-(3,4-Dimethoxyphenyl)Pyrroline-5-Carbohydrazide*

Ethyl 2-(3,4-dimethoxyphenyl)pyrroline-5-carboxylate (1.4 g., 0.005 mole) was dissolved in 10 ml. of absolute ethanol and 1 ml. of hydrazine hydrate (99–100%) was added. The reaction mixture was stored at room temperature for 18 hours; a product (1.1 g., M.P. 179–180° dec.) crystallized. Substitution of hydrazine anhydrous (95%+, 1 ml.) for hydrazine hydrate in identical experiment yielded an identical product (1.1 g., M.P. 179–180° dec.). The two products were combined and recrystallized twice from methanol (ca. 50 ml.) to yield 1.4 g. of the desired compound; M.P. 180–182° dec.

Ultraviolet spectrum:

$\lambda_{max.}^{MeOH}$ 296 m$\mu$ ($\epsilon$, 9000); 268 m$\mu$ ($\epsilon$, 14,000); shoulder at 222 m$\mu$ ($\epsilon$, 15,000)

*Example 21.—2-(3,4-Dimethoxyphenyl)Pyrroline-5-Carboxamide*

Ethyl 2-(3,4-dimethoxyphenyl)pyrroline-5-carboxylate (15.4 g., 0.075 mole) was dissolved in 100 ml. of ethanol 2B. The solution was saturated with anhydrous ammonia in a pressure bottle at ice bath temperature. The mixture was kept at room temperature for one week, was then resaturated with ammonia. The crystalline product which formed after two additional weeks (8.4. g.; M.P. 142–150°) was recrystallized twice from isopropanol (50 ml., charcoal) to give 6.0 g. of the desired compound; M.P. 147–149°. The mother liquor was resaturated with ammonia and stored at room temperature for another week. The solution was evaporated to dryness under reduced pressure, the residue was dissolved in 60 ml. of isopropanol and the resulting solution was treated with charcoal. Additional product (4.2 g., M.P. 147–149°) crystallized.

Ultraviolet spectrum:

$\lambda_{max.}^{MeOH}$ 268 m$\mu$ ($\epsilon$, 1.4×10$^4$), 296 m$\mu$ ($\epsilon$, 8.7×10$^3$), shoulder at 224 m$\mu$

*Example 22.—2-(3,4-Dimethoyphenyl)-N-Ethylpyrroline-5-Carboxamide*

Ethyl 2-(3,4-dimethoxyphenyl)pyrroline-5-carboxylate (5.4 g., 0.02 mole) was dissolved in 100 ml. of ethanolic monoethylamine (10%). The solution was kept at room temperature for one week and was then evaporated to dryness under reduced pressure to yield a reaction product (4.3 g., M.P. 106–108°). Recrystallization from isopropanol-isopropyl ether (1:95, 20 ml.) gave the desired product; M.P. 109–111°.

*Example 23.—Ethyl 2-(3,4-Methylenedioxyphenyl) Pyrroline-5-Carboxylate*

(a) 3,4-methylenedioxyacetophenone was prepared from piperonylic acid essentially by the method reported by H. L. Drake and W. B. Tuemmler, J. Am. Chem. Soc., 77 1204 (1955). The final product was extracted with ether and crystallized from isopropanol-hexane (1:5). Yield ca. 60%, M.P. 82–85° (lit. M.P. 84–87°).

(b) 3-dimethylamino-3',4'-methylenedioxypropiophenone hydrochloride: A mixture of 3,4-methylenedioxyacetophenone (49.2 g., 0.3 mole, dimethylamine hydrochloride (36.6 g., 0.45 mole), paraformaldehyde (13.5 g., 0.45 mole), ethanol 2B (120 ml.) and concentrated hydrochloric acid (1.5 ml.) was heated under reflux for four hours. The hot reaction mixture was added to boiling acetone (450 ml.). The product crystallized (53.8 g., M.P. 194–195°). Recrystallization from methanol (ca. 250 ml.) yielded 45 g. of the desired compound; M.P. 197–198°.

Ultraviolet spectrum:

$\lambda_{max.}^{MeOH}$ 308 m$\mu$ ($\epsilon$, 8,000); 273 m$\mu$ ($\epsilon$, 7,000); 227 m$\mu$ ($\epsilon$, 17,000)

(c) Diethyl [3-(3,4-methylenedioxyphenyl) - 3 - oxopropyl]acetamidomalonate: The compound under (b) above (0.025 mole, 6.4 g.) was suspended in absolute ethanol (40 ml., dried by distillation over sodium and diethyl succinate), and dimethyl sulfate (3.8 g., 0.03 mole) was added dropwise at room temperature. The reaction was allowed to proceed at room temperature for three hours with continuous stirring. Subsequent addition of diethyl acetamidomalonate (4.9 g., 0.023 mole) suspended in sodium ethoxide solution (prepared from 0.05 mole of sodium and 40 ml. of absolute ethanol) resulted in a slightly exothermic reaction. The mixture was allowed to react at room temperature for one hour, was then heated under reflux for two hours, and stirred at room temperature overnight. The reaction mixture was added to chipped ice (200 g.). The reaction product (8.0 g., M.P. 93–95°) crystallized. Two recrystallizations from isopropanol (ca. 20 ml.) yielded 7.0 g. of the desired compound; M.P. 95–97°.

Ultraviolet spectrum:

$\lambda_{max.}^{MeOH}$ 305 m$\mu$ ($\epsilon$, 8,000); 270 m$\mu$ ($\epsilon$, 7,000); 227 m$\mu$ ($\epsilon$, 18,000)

(d) 2-(3,4-methylenedioxyphenyl)pyrroline-5 - carboxylic acid hydrochloride: A suspension of the compound under (c) above (19.5 g., 0.05 mole) in 3 N hydrochloric acid (100 ml.) was heated under reflux for seven hours. The solution was filtered and evaporated to dryness under reduced pressure to yield oil. As the desired compound resisted crystallization, the crude oil was directly esterified.

(e) Ethyl 2-(3,4-methylenedioxyphenyl)pyrroline - 5-carboxylate: The above compound (crude oil, 0.05 mole) was dissolved in absolute ethanol (100 ml.). Sulfuric acid (reagent grade, 10 ml.) was added and the solution was heated under reflux for three hours. Ethanol was removed by distillation under reduced pressure and the residue was treated at ice bath temperature with saturated sodium carbonate solution (to pH 9). The mixture was extracted with chloroform (3 x 75 ml.). The combined chloroform extract was washed with 5% NaOH, water, dried over sodium sulfate and evaporated to dryness. The residue was crystallized from isopropyl ether (ca. 10 ml.) to give the reaction product (10.2 g., M.P. 47–49°). Recrystallization from isopropyl ether (30 ml.) yielded 6.9 g. of the desired compound; M.P. 47–49°.

Ultraviolet spectrum:

$\lambda_{max.}^{MeOH}$ 303 m$\mu$ ($\epsilon$, 10,000); 269 m$\mu$ ($\epsilon$, 12,000); 224 m$\mu$ ($\epsilon$, 19,000)

*Example 24.—2-(3,4-Methylenedioxyphenyl)Pyrroline-5-Carboxamide*

Ethyl 2-(3,4-methylenedioxyphenyl)pyrroline-5 - carboxylate (6.5 g., 0.025 mole) was dissolved in ethanol 2B (100 ml.). The solution was saturated with anhydrous ammonia in a pressure bottle at ice bath temperature. The solution was stored at room temperature for six days. The product that had crystallized (3.7 g., M.P. 205–208° dec.) was filtered off. This was recrystallized twice from methanol (150 ml.) to yield 2.3 g. of the desired compound; M.P. 206–208° dec.

Ultraviolet spectrum:

$\lambda_{max.}^{MeOH}$ 303 m$\mu$ ($\epsilon$, 9,000); 268 m$\mu$ ($\epsilon$, 10,000); 223 m$\mu$ ($\epsilon$, 17,000)

*Example 25.—Ethyl 2-[6-(1,4-Benzodioxan)]Pyrroline-5-Carboxylate*

(a) 3,4-dihydroxyacetophenone was prepared from catechol as described by D. R. Howton, J. F. Mead and W. G. Clark, J. Am. Chem. Soc., 77, 2896 (1955); yield ca. 40%, M.P. 119–121° (lit. M.P. 119°). The product was decolorized by passing it, dissolved in ethyl acetate, through a neutral alumina column. It was recrystallized from ethyl acetate-benzene. The ultraviolet spectra of the phenol and its sodium salt were identical to those reported in the literatures [S. Sehnoh, J. Daly, J. Axelrod, and B. Witkop, J. Am. Chem. Soc., 81, 6240 (1959)].

(b) 6-acetyl-1,4-benzodioxan: The compound under (a) above (44 g., 0.29 mole) and finely powdered anhydrous potassium carbonate (200 g.) were suspended in anhydrous acetone (750 ml.). Ethylene bromide (68 g., 0.36 mole) was added dropwise while stirring, and the mixture was then heated under reflux with continuous stirring for 24 hours. The hot reaction mixture was filtered, and the precipitate (salts) was washed with additional hot acetone (ca. 500 ml.); the acetone solution was evaporated to dryness. The residue was suspended in water (100 ml.), the suspension was rendered alkaline with saturated sodium carbonate solution (to pH 10) and extracted with chloroform (3 x 100 ml.). The chloroform extract was dried over sodium sulfate and evaporated to dryness. The product was crystallized from ethanol (75 ml.) to give the desired compound (39.0 g., M.P. 81–83°). 6-acetyl-1,4-benzodioxan had previously been synthesized by acetylation of 1,4-benzodioxan [J. J. Denton, et al., J. Am. Chem. Soc. 71, 2048 (1949), M.P. 78–81°].

(c) 6-($\beta$-dimethylaminopropionyl)-1,4 - benzodioxan hydrochloride: A mixture of 6-acetyl-1,4-benzodioxan (89 g., 0.5 mole), dimethylamine hydrochloride (45 g., 0.55 mole), paraformaldehyde (22.5 g., 0.75 mole), ethanol 2B (150 ml.) and concentrated hydrochloric acid (2.5 ml.) was heated under reflux for two hours. Additional paraformaldehyde (15 g., 0.5 mole) was added and the mixture was heated under reflux for three more hours. The hot reaction mixture was added to boiling acetone (800 ml.) and the desired product crystallized (82 g., M.P. 153–154°). Recrystallization from ethanol (150 ml.) gave 87 g. of the desired compound; M.P. 153–155°.

(d) Diethyl[3-[6-(1,4-benzodioxan)] - 3 - oxopropyl]-acetamidomalonate: The above compound (34.0 g., 0.125 mole) was suspended in absolute ethanol (150 ml., dried by distillation over sodium and diethyl succinate) and dimethyl sulfate (19.0 g., 0.15 mole) was added dropwise at room temperature. The reaction was allowed to proceed at room temperature for three hours with continuous stirring. Subsequent addition of diethyl acetamido-malonate (24.5 g., 0.115 mole) suspended in sodium ethoxide solution (prepared from 0.25 mole of sodium and 150 ml. of dry ethanol) resulted in a slightly exothermic reaction. The mixture was stirred at room temperature for twenty hours. The reaction mixture was added to chipped ice (1000 g.) and was neutralized to pH 6 with 5% hydrochloric acid. The reaction product (32.4 g., M.P. 103–105°) crystallized on standing. Recrystallization from isopropanol (ca. 85 ml.) yielded the desired compound (29.3 g., M.P. 105–106°).

Ultraviolet spectrum:

$\lambda_{max.}^{MeOH}$ 303 m$\mu$ ($\epsilon$, 9,000); 271 m$\mu$ ($\epsilon$, 16,000); 228 m$\mu$ ($\epsilon$, 24,000)

(e) 2-[6-(1,4-benzodioxan)]pyrroline - 5 - carboxylic acid hydrochloride: A suspension of the above compound (d) (20.3 g., 0.05 mole) in 3 N hydrochloric acid (100 ml.) was heated under reflux for six hours. The resulting solution was filtered, evaporated to dryness under reduced pressure. Acetone (100 ml.) was added, crystallization occurred yielding the desired compound (12.3 g., M.P. 217° dec.). The crude product was directly esterfied.

(f) Ethyl 2 - [6 - (1,4 - benzodioxan)]pyrroline - 5-carboxylate: The above compound (e) (12.2 g., 0.043 mole) was dissolved in absolute ethanol (120 ml.). Sulfuric acid (reagent grade, 12 ml.) was added and the solution was heated under reflux for three hours. Ethanol was removed by distillation under reduced pressure and the residue was treated at ice bath temperature with saturated sodium carbonate solution (to pH 9). The mixture was extracted with chloroform (3 x 100 ml.). The combined chloroform extract was washed with 5% NaOH, water, dried over sodium sulfate and evaporated to dryness. The residue was crystallized from isopropanol (25 ml.) to give 10 g. of the desired compound; M.P. 70–72°.

Ultraviolet spectrum:

$\lambda_{max.}^{MeOH}$ 300 m$\mu$ ($\epsilon$, 7,000); 268 m$\mu$ ($\epsilon$, 14,000); 224 m$\mu$ ($\epsilon$, 19,000)

*Example 26.—Methyl 2-[6-(1,4-Benzodioxan)]Pyrroline-5-Carboxylate*

2-6-(1,4-benzodioxan) pyrroline-5-carboxylic acid hydrochloride (14.2 g., 0.05 mole) was dissolved in absolute methanol (125 ml.). Sulfuric acid (reagent grade, 12.5 ml.) was added while cooling the solution. Then the mixture was heated under reflux for three hours. Methanol was removed by distillation under reduced pressure and the residue was treated at ice bath temperature with saturated sodium carbonate solution (to pH 9). The mixture was extracted with chloroform (3 x 100 ml.). The combined chloroform extract was washed with 5% NaOH, water, dried over sodium sulfate and evaporated to dryness. The residue crystallized from isopropanol (20 ml.) to give the reaction product (11.2 g., M.P. 69–71°). Recrystallization from isopropanol yielded 9.2 g. of the desired compound; M.P. 69–71°.

Ultraviolet spectrum:

$\lambda_{max.}^{MeOH}$ 300 m$\mu$ ($\epsilon$, 7,000); 267 m$\mu$ ($\epsilon$, 13,000); 224 m$\mu$ ($\epsilon$, 18,000)

*Example 27.—2-[6-(1,4-Benzodioxan)]Pyrroline-5-Carboxamide*

Ethyl 2-[6-(1,4-benzodioxan)]-pyrroline-5-carboxylate (5.5 g., 0.02 mole) was dissolved in ethanol 2B (100 ml.). The solution was saturated with anhydrous ammonia in pressure bottle at ice bath temperature. The solution was stored at room temperature for six days, was resaturated with ammonia and stored at room temperature for two additional weeks. A crystalline product (3.3 g., M.P. 160–162°) was filtered off; the mother liquor was evaporated to dryness and the residue was crystallized from isopropanol (50 ml.) to yield additional product (1.1 g., M.P. 159–161°). The first crop material was recrystallized twice from isopropanol (ca. 100 ml.) to give 2.8 g. of the desired compound; M.P. 171–173°.

Ultraviolet spectrum:

$\lambda_{max.}^{MeOH}$ 301 m$\mu$ ($\epsilon$, 7,000); 268 m$\mu$ ($\epsilon$, 14,000); 226 m$\mu$ ($\epsilon$, 20,000)

*Example 28.—Ethyl 2-(3,4,5-Trimethoxyphenyl) Pyrroline-5-Carboxylate*

(a) 3,4,5-trimethoxyacetophenone was prepared in ca. 60% yield from 3,4,5-trimethoxybenzoic acid. 3,4,5-trimethoxybenzoic acid was converted to the acid chloride as described by A. Lasslo, et al., J. Org. Chem., 21, 805 (1956). The crude acid chloride was converted to diethyl 3,4,5-trimethoxybenzoylmalonate (M.P. 90–92°) employing the method of C. D. Gutsche et al., J. Am. Chem. Soc., 80, 5756 (1958); M.P. lit. 91–92°. This was in turn converted to 3,4,5-trimethoxyacetophenone (M.P. 79–81°, recrystallized from isopropanol) by the procedure of H. G. Walker and C. R. Hauser, J. Am. Chem. Soc., 68, 1386 (1946); M.P. lit. 75–78°.

(b) 3 - dimethylamino - 3',4',5' - trimethoxypropiophenone hydrochloride was prepared in ca. 60% yield from the above acetophenone as described by E. Haggett and S. Archer, J. Am. Chem. Soc., 71, 2255 (1949).

(c) Diethyl [3 - (3,4,5 - trimethoxyphenyl)-3-oxopropyl]acetamidomalonate: The above compound (b) (45.6 g., 0.15 mole) was suspended in anhydrous ethanol (dried by distillation from sodium and diethyl succinate, 150 ml.) and dimethyl sulfate (22.7 g., 0.18 mole) was added dropwise at room temperature. Reaction was allowed to proceed at room temperature for three hours with continuous stirring. Subsequent addition of diethyl acetamidomalonate (32.5 g., 0.15 mole) suspended in sodium ethoxide solution (prepared by dissolving 0.30 mole of sodium in 200 ml. of anhydrous ethanol), resulted in a slightly exothermic reaction. The mixture was stirred at room temperature for one hour, then heated under reflux for five hours, and stirred at room temperature overnight; it was then added to chipped ice (1000 g.). The reaction product (50.8 g., M.P. 104–105°) crystallized. Recrystallization from isopropanol yielded the desired compound (47.3 g., M.P. 111–113°).

Ultraviolet spectrum:

$\lambda_{max.}^{MeOH}$ 280 m$\mu$ ($\epsilon$, 11,000); 219 m$\mu$ ($\epsilon$, 27,000)

(d) 2 - (3,4,5 - trimethoxyphenyl)pyrroline-5-carboxylic acid hydrochloride. A suspension of the above compound (c) (31.4 g., 0.0715 mole) in 3 N hydrochloric acid (150 ml.) was heated under reflux for five hours. The resulting solution was filtered and evaporated to dryness under reduced pressure. Addition of acetone (150 ml.) led to crystallization of the desired product (20 g., M.P. 195–196° dec.) which was directly esterified.

(e) Ethyl 2-(3,4,5 - trimethoxyphenyl)pyrroline-5-carboxylate. The above hydrochloride (24.3 g., 0.077 mole) was dissolved in absolute ethanol (200 ml.) Sulfuric acid (reagent grade, 20 ml.) was added, and the mixture was heated under reflux for three hours. Ethanol was then removed by distillation under reduced pressure; the residue was treated with saturated sodium carbonate solution (to pH 9) and extracted with chloroform (3 x 150 ml.). The combined chloroform extract was washed with 5% sodium hydroxide, water, dried over sodium sulfate and evaporated dryness. Addition of isopropyl ether (65 ml.) to oily residue led to crystallization (21.5 g., M.P. 70–72°). Recrystallization from isopropyl ether gave 17.3 g. of the desired product; M.P. 72–73°.

Ultraviolet spectrum:

$\lambda_{max.}^{MeOH}$ 273 m$\mu$ ($\epsilon$, 13,000); 217 m$\mu$ ($\epsilon$, 18,000)

*Example 29.—2-(3,4,5-Trimethoxyphenyl)Pyrroline-5-Carboxamide*

Ethyl 2-(3,4,5-trimethoxyphenyl)pyrroline-5-caroboxylate (6.15 g., 0.02 mole) was dissolved in ethanol 2B (100 ml.). The solution was saturated with anhydrous ammonia in a pressure bottle at ice bath temperature. The solution was stored at room temperature for three days. The solution was then resaturated with ammonia and stored at room temperature for ten additional days. The solution was evaporated to dryness and the oily colored residue was dissolved in chloroform (50 ml.). The chloroform solution was first washed with water and then extracted with 5% hydrochloric acid (3 x 50 ml.). The acid solution was washed with chloroform, neutralized to pH 9 with saturated sodium carbonate solution and extracted with chloroform (3 x 75 ml.). The chloroform extract was washed with water, dried over sodium sulfate and evaporated to dryness. The residue (6.6 g.) was dissolved in boiling isopropanol (25 ml.), and the reaction product (4.2 g., M.P. 136.5–138.0°) crystallized on standing. Two recrystallizations from isopropanol yielded 2.9 g. of the desired compound; M.P. 138–140°.

Ultraviolet spectrum:

$\lambda_{max.}^{MeOH}$ 273 m$\mu$ ($\epsilon$, 11,000); 216 m$\mu$ ($\epsilon$, 24,000)

*Example 30.—2-(3,4-Dimethoxyphenyl)Pyrroline-5-[N-(2-Dimethylamino-Ethyl)]Carboxamide*

A solution of methyl 2-(3,4-dimethoxyphenyl)- pyrroline-5-carboxylate (7.9 g., 0.03 mole) and N,N-dimethylaminoethylamine (12 ml.) in methanol (60 ml.) was heated under reflux for 36 hours. The solvent was removed by distillation under reduced pressure and last traces of amine were removed by drying at 100°/0.3 mm. Hg. The oily residue was dissolved in chloroform (10 ml.). The chloroform solution was first washed with $H_2O$ (5 ml.) and then extracted with 5% HCl (3 x 50 ml.). The acid aqueous solution was washed with chloroform, then neutralized (to pH 9) with saturated sodium carbonate solution and extracted with chloroform (3 x 75 ml.). The chloroform extract was washed with water, dried over sodium sulfate and evaporated to dryness. The residue was dissolved in boiling isopropyl ether (35 ml.), the reaction product (7.3 g., M.P. 84–86°) crystallized. Three recrystallizations from isopropanol-isopropyl ether (1:5, 25 ml.) yielded 3.0 g. of the desired compound; M.P. 87–88°.

Ultraviolet spectrum:

$\lambda_{max.}^{MeOH}$ 296 m$\mu$ ($\epsilon$, 9,800); 268 m$\mu$ ($\epsilon$, 16,000); shoulder at 220 m$\mu$

*Example 31.—1-[2-(3,4-Dimethoxyphenyl)Pyrroline-5-Carbonyl]-4-Phenylpiperazine*

A solution of methyl 2-(3,4-dimethoxyphenyl)pyrroline-5-carboxylate (8.0 g., 0.03 mole) and 1 phenylpiperazine (24.3 g., 0.15 mole) in toluene (30 ml.) was heated at 130° for four (4) days. The solution was evaporated to dryness under high vacuum. The oily residue was crystallized from isopropyl ether-isopropanol (20:1, 70 ml.) to yield the reaction product (7.5 g., M.P. 97–99°). Two recrystallizations from isopropanol yielded 6.0 g. of the desired compound; M.P. 101–103°.

Ultraviolet spectrum:

$\lambda_{max.}^{MeOH}$ 294 m$\mu$ ($\epsilon$, 11,000); 254 m$\mu$ ($\epsilon$, 21,000) shoulder at 224 m$\mu$

*Example 32.—1-[2-(3,4-Dimethoxyphenyl)Pyrroline-5-Carbonyl]-4-Methylpiperazine*

A solution of methyl 2-(3,4-dimethoxyphenyl)pyrroline-5-carboxylate (8.0 g., 0.03 mole) and 1-methylpiperazine (15.0 g., 0.15 mole) in toluene (30 ml.) was heated at 120° for four days. The solution was evaporated to dryness under reduced pressure. The oily residue (11 g.) was dissolved in chloroform (50 ml.); the chloroform solution was first washed with water and then extracted with 5% hydrochloric acid (4 x 50 ml.). The acid aqueous solution was washed with chloroform, was neutralized (to pH 9) with saturated sodium carbonate solution and was reextracted with chloroform (5 x 50 ml.). The chloroform extract was washed with water, dried over sodium sulfate and evaporated to dryness. The oily residue was dissolved in isopropanol (20 ml.) and ethanolic HCl (9.9 N, 7 ml.) was added; a hygroscopic product (9 g., M.P. 217–218°) crystallized. The hydrochloride salt was dissolved in water, the solution was rendered alkaline, and extracted with chloroform. The chloroform extract was evaporated to dryness, and the oily residue was crystallized from isopropanol-isopropyl ether (1:5, 20 ml.); yield 5.1 g., M.P. 98–101°. An isopropanol-isopropyl ether (1:1) solution of the product was partially decolorized by filtration through a basic alumina column (5 g.). The solution was reevaporated to dryness and the residue was twice recrystallized from isopropanol-isopropyl ether (1:10, 50 ml.) to yield 3.6 g. of the desired compound; M.P. 101–103°.

Ultraviolet spectrum:

$\lambda_{max.}^{MeOH}$ 266 m$\mu$ ($\epsilon$, 16,000); 295 m$\mu$ ($\epsilon$, 10,000)

*Example 33.—Ethyl 2-(4-Hydroxy-3-Methoxyphenyl) Pyrroline-5-Carboxylate*

(a) 3-dimethylamino-4'-hydroxy - 3' - methoxypropiophenone hydrochloride: This compound [F. F. Blicke and W. K. Johnson, J. Am. Pharm. Assoc. 45, 440 (1956); M.P. 184°] was synthesized by the general procedure for the preparation of ketonic Mannich bases (C. E. Maxwell, Org. Synth., Coll. vol. III, p. 305). A mixture of acetovanillone (0.1 mole), paraformaldehyde (0.13 mole), dimethylamine hydrochloride (0.13 mole), ethanol (25 ml.) and conc. hydrochloric acid (0.2 ml.) was heated under reflux for one hour. After cooling, the reaction product was redissolved in ethanol (ca. 200 ml.), allowed to crystallize, recrystallized twice from ethanol (ca. 200 ml.) to yield the desired compound (0.045 mole, M.P. 186–189°).

(b) Diethyl acetamido-[3-(4-hydroxy-3-methoxyphenyl)-3-oxopropyl]malonate: The compound obtained under (a) above (7.8 g., 0.03 mole) was suspended in 50 ml. of absolute ethanol and 4.55 g. (0.036 mole) of dimethyl sulfate was added dropwise at room temperature. Reaction was allowed to proceed at room temperature with continuous stirring for two hours. Subsequent addition of 5.9 g. (0.028 mole) diethyl acetamidomalonate, suspended in sodium ethoxide solution (0.09 mole of sodium, in 50 ml. absolute ethanol), resulted in a slightly exothermic reaction. The mixture was allowed to react at room temperature for one hour, was then heated under reflux for an additional hour and stirred at room temperature overnight. The reaction mixture was added to 200 g. of chipped ice and was neutralized to pH 5 with 5% hydrochloric acid. The reaction product (6.8 g.; M.P. 85–90°) crystallized and was recrystallized twice from isopropanol to yield 5.0 g. of the desired compound; M.P. 88–90°.

(c) 2 - (4 - hydroxy - 3 - methoxyphenyl)pyrroline-5-carboxylic acid hydrochloride: A suspension of the above malonate (31.6 g., 0.08 mole) and 140 ml. of 6 N hydrochloric acid was heated under reflux for 3 hours. The solution was filtered, evaporated to dryness under reduced pressure. Acetone (300 ml.) was added to the solid residue. The compound obtained (19.7 g., 0.072 mole; M.P. 234–235°) was directly esterified.

(d) Ethyl 2-(4-hydroxy-3-methoxyphenyl)pyrroline-5-carboxylate: The above carboxylic acid (13.6 g., 0.05 mole) was dissolved in 100 ml. of absolute ethanol. Sulfuric acid (reagent grade, 10 ml.) was added and the mixture was heated under reflux for three hours. Ethanol was removed by distillation under reduced pressure, and the residue was treated at ice-bath temperature with saturated sodium carbonate solution (to pH 7). The mixture was extracted with chloroform (3 x 100 ml.); the combined chloroform extract was washed with sodium bicarbonate solution (1%) and water; dried over sodium sulfate and evaporated to dryness. The oily residue (13.3 g.) was crystallized from isopropanol (10.2 g., M.P. 117–119°). Three recrystallizations from isopropanol yielded 6.4 g. of the desired compound as yellow prisms; M.P. 115–117°.

Ultraviolet spectrum:

$\lambda_{max.}^{MeOH}$ 268 m$\mu$ ($\epsilon$, 13,000); 295 m$\mu$ ($\epsilon$, 9,000)

$\lambda_{max.}^{0.1\ N\ NaOH}$ 322 m$\mu$ ($\epsilon$, 23,000); shoulders at 225 m$\mu$ and 295 m$\mu$

*Example 34.—2-(4-Hydroxy-3-Methoxyphenyl) Pyrroline-5-Carboxamide*

Ethyl 2-(4-hydroxy-3-methoxyphenyl)pyrroline-5-carboxylate (15.8 g., 0.06 mole) and 100 ml. of ethanol were placed in a pressure bottle, cooled to 0° and saturated with ammonia. The solution was stored at room temperature for twelve days. The precipitate (9.0 g.; 192–193°) was removed by filtration. The mother liquor was resaturated with ammonia and stored at room temperature for two additional weeks. A further precipitate (3.7 g., M.P. 195–197°) formed. Recrystallization of combined product from methanol (charcoal treatment) yielded white crystals (9.4 g., M.P. 197–199°). One further recrystallization from methanol gave the desired compound; M.P. 198–200° (dec.).

Ultraviolet spectrum:

$\lambda_{max.}^{MeOH}$ 271 m$\mu$ ($\epsilon$, 13,000); 300 m$\mu$ ($\epsilon$, 10,000); shoulders at 225 m$\mu$ and 300 m$\mu$ $\lambda_{max.}^{0.1\ N\ NaOH}$ 324 m$\mu$ ($\epsilon$, 22,000); shoulders at 225 m$\mu$

*Example 35.—Ethyl 2-(3-Hydroxy-4-Methoxyphenyl) Pyrroline-5-Carboxylate*

(a) Acetyl isoacetovanillone, M.P. 64–67°, was prepared in ca., 25% yield from guaiacol according to the procedure of R. Schwarz and K. Capek, Mh. Chem. 83, 883 (1952), M.P. 66°. Acetyl isoacetovanillone was recrystallized from isopropyl ether instead of water.

(b) 3 - dimethylamino - 3' - hydroxy - 4' - methoxypropiophenone hydrochloride: A mixture of the above vanillone (82 g., 0.45 mole) dimethylamine hydrochloride (57 g., 0.68 mole), paraformaldehyde (34 g., 1.12 mole), alcohol 2B (125 ml.) and concentrated hydrochloric acid (1.25 ml.) was heated under reflux for three hours. The mixture was transferred to an Erlenmeyer flask with 100 ml. of ethanol and a reaction product (94 g.; M.P. 188–190°) crystallized on standing. Recrystallization from 600 ml. of methanol yielded the desired compound (45.3 g., M.P. 199–201°) and a second crop of 22 g., M.P. 179–186°, which was satisfactory for condensation with diethyl acetamidomalonate in the next step. The product of the above reaction was identical to the one obtained via a Mannich reaction using isoacetovanillone (3-hydroxy-4-methoxy-acetophenone).

(c) Diethyl acetamido-[3-(3-hydroxy-4-methoxyphenyl)-3-oxopropyl]malonate: The compound obtained under (b) above (39 g., 0.15 mole) was suspended in 250 ml. of absolute ethanol (dried by distillation over sodium and diethyl succinate), and 22.7 g. (0.18 mole) dimethyl sulfate was added dropwise at room temperature. The reaction was allowed to proceed at room temperature for two hours with continuous stirring. Subsequent addition of 29.5 g. (0.14 mole) diethyl acetamidomalonate suspended in sodium ethoxide solution (prepared by dissolving 0.45 mole of sodium in 250 ml. of absolute ethanol) resulted in a slightly exothermic reaction. The mixture was stirred at room temperature for one hour, then heated under reflux for two hours, and again stirred overnight at room temperature. The reaction mixture was added to 1000 g. of ice and neutralized to pH 5 with 5% hydrochloric acid. The reaction product (61 g., M.P. 130–133°) crystallized on standing. Recrystallization from 250 ml. of isopropanol yielded 47 g. of the desired compound; M.P. 138–139°.

(d) 2-(3-hydroxy-4-methoxyphenyl)pyrroline-5-carboxylic acid hydrochloride: A suspension of the above malonate (39.5 g., 0.1 mole) in 300 ml. of 6 N hydrochloric acid was heated under reflux for three hours. The resulting solution was filtered, evaporated to dryness under reduced pressure. Acetone (200 ml.) was added to the solid residue. The compound obtained (23.9 g.; M.P. 225–227° dec.) was directly esterified.

(e) Ethyl 2-(3-hydroxy-4-methoxyphenyl)pyrroline-5-carboxylate: The above carboxylic acid (13.6 g., 0.05 mole) was dissolved in 100 ml. of absolute ethanol. Sulfuric acid (reagent grade, 10 ml.) was added and the mixture was heated under reflux for three hours. Ethanol was removed by distillation under reduced pressure and the residue was treated at ice bath temperature with saturated sodium carbonate solution (to pH 7). The mixture was extracted with chloroform (3 x 100 ml.). The combined chloroform extract was washed twice, first with 1% sodium bicarbonate solution, and then with distilled water. The washed extract was dried over sodium sulfate and evaporated to dryness. The oily residue (13.0 g.) was crystallized from 50 ml. of isopropanol to give 10.1 g. of the desired compound; M.P. 91–93°. Recrystallization from isopropanol yielded 8.6 g. of white needles; M.P. 92–93°.

Ultraviolet spectrum:

$\lambda_{max.}^{MeOH}$ 223 m$\mu$ ($\epsilon$, 1.5×10$^4$), 265 m$\mu$ ($\epsilon$, 1.3×10$^3$), 298 m$\mu$ ($\epsilon$, 7.6×10$^3$)

$\lambda_{max.}^{0.1\ N\ NaOH}$ 238 m$\mu$ ($\epsilon$, 2.4×10$^4$), 270 m$\mu$ ($\epsilon$, 8.1×10$^3$), 321 m$\mu$ ($\epsilon$, 5.9×10$^3$)

Example 36.—2-(3-Hydroxy-4-Methoxyphenyl) Pyrroline-5-Carboxamide

Ethyl 2-(3-hydroxy-4-methoxyphenyl)pyrroline-5-carboxylate (15.8 g., 0.06 mole) was suspended in 100 ml. of ethanol. The mixture was placed in a pressure bottle, cooled in ice bath and saturated with ammonia. The mixture was stored at room temperature with occasional agitation for two weeks. The precipitate (5.8 g., M.P. 153–162°) was recrystallized from methanol to give a crystalline product (A, 1.5 g., M.P. 207–208° dec.). The mother liquor was resaturated with ammonia and stored at room temperature for two additional weeks to yield more reaction product (B, 1.8 g., M.P. 207–209° dec.). Two recrystallizations of combined A and B from methanol yielded 2.0 g. of the desired compound; M.P. 208–210° dec. Further treatment of mother liquor with ammonia led to the isolation of 5.0 g. of additional product; M.P. 204–206° (dec.).

Ultraviolet spectrum:

$\lambda_{max.}^{MeOH}$ 226 m$\mu$ ($\epsilon$, 1.6×10$^4$), 268 m$\mu$ ($\epsilon$, 1.3×10$^4$), 302 m$\mu$ ($\epsilon$, 7.7×10$^3$)

$\lambda_{max.}^{0.1\ N\ NaOH}$ 242 m$\mu$ ($\epsilon$, 2.4×10$^4$), 276 m$\mu$ ($\epsilon$, 8.4×10$^3$), 329 m$\mu$ ($\epsilon$, 6.3×10$^3$)

Example 37.—2-Methyl-4-Phenylpyrroline-5-Carboxylic Acid Hydrochloride (a) Diethyl acetamido-(3-oxo-1-phenylbutyl)-malonate: Diethyl acetamidomalonate (41.2 g., 0.19 mole) was suspended in absolute ethanol (160 ml., dried by distillation over sodium and diethyl succinate). Sodium (0.2 g.) was dissolved in absolute ethanol (10 ml.) and sodium ethoxide solution was added to above suspension. A solution of trans 4-phenyl-3-buten-2-one (29.2 g., 0.2 mole) in absolute ethanol (50 ml.) was then added dropwise. The mixture was stirred overnight at room temperature, was then neutralized to pH 6 with glacial acetic acid and evaporated to dryness. The resulting oil was dissolved in chloroform (100 ml.), the chloroform solution was washed with water, dried over sodium sulfate and evaporated to dryness to yield an oil (70.5 g.). Crystallization from isopropanol (60 ml.) gave the desired product (37.6 g., M.P. 98.5–102°).

(b) 2-methyl-4-phenylpyrroline-5-carboxylic acid hydrochloride: A suspension of the above compound (a) (36.8 g., 0.1 mole) in 3 N hydrochloric acid (250 ml.) was heated under reflux for five hours. The resulting solution was filtered, evaporated to dryness under reduced pressure. Acetone (300 ml.) was added to the oily residue; the reaction product (13.7 g., M.P. 188–195° dec.) crystallized. Recrystallization from methanol-isopropanol (1:2, 150 ml.) yielded 8.6 g. of the desired compound; M.P. 192–193° dec.

Example 38.—Methyl 2-Methyl-4-Phenylpyrroline-5-Carboxylate 2-methyl-4-phenylpyrroline-5-carboxylic acid hydrochloride (16 g., 0.067 mole) was dissolved in absolute methanol (130 ml.). Sulfuric acid (reagent grade, 13 ml.) was added and the mixture was heated under reflux for three hours. Methanol was evaporated under reduced pressure, the mixture was rendered basic (to pH 9) with saturated sodium carbonate solution and was extracted with chloroform (3 x 100 ml., 1 x 50 ml.). The chloroform extract was washed with water, dried over sodium sulfate and evaporated to dryness to yield an oil (12.6 g.). Two distillations gave 10.6 g. of the desired compound; B.P. 109–111°/0.2 mm.; $n_D^{24}$ 1.5530.

Example 39.—2-Methyl-4-Phenylpyrroline-5-Carboxamide Hydrochloride

Methyl 2-methyl-4-phenylpyrroline-5-carboxylate (6.15 g., 0.028 mole) was dissolved in methanol (100 ml.); the solution was saturated with ammonia and stored at room temperature in a pressure bottle for 5 days. The solution was evaporated to dryness. The resulting oil (6.3 g.) was dissolved in isopropanol (10 ml.) and 10 N ethanolic hydrochloric acid (4 ml.) was added. The amide hydrochloride (6.2 g., M.P. 226° dec.) crystallized. Two recrystallizations from methanol-isopropanol (2:3, 100 ml.) gave 3.9 g. of the desired compound; M.P. 226–228° dec.

Ultraviolet spectrum:

$\lambda_{max.}^{MeOH}$ 268 m$\mu$ ($\epsilon$, 170), 257 m$\mu$ ($\epsilon$, 344), 262 m$\mu$ ($\epsilon$, 232)

B. PYRROLIDINE DERIVATIVES

Example 40.—5-Phenylpyrrolidine-2-Carboxylic Acid Hydrochloride-(5-Phenylproline Hydrochloride)

2-phenylpyrroline-5-carboxylic acid hydrochloride (Ex. 1—22.5 g., 0.1 mole) was dissolved in 200 ml. of 95% ethanol. Catalyst (0.3 g. of platinum oxide) was added and the mixture was hydrogenated at 45 lbs. pressure and room temperature. The theoretical amount of hydrogen was consumed within one hour. The catalyst was removed by filtration and the solution was evaporated to dryness under reduced pressure. The oily residue crystallized to 25.6 g. on standing in a refrigerator; M.P. 132° (foam). Recrystallization from ca. 100 ml. isopropanol yielded 13.0 g. of a product A (M.P. 140–142°.). Further recrystallization from isopropanol gave 7.7 g. of product A (M.P. 140–142°).

Further crystallization from mother liquor yielded a "high melting" product B (M.P. 180°), which on recrystallization (seeding with product A) gave a "low melting" product. Recrystallization of 5.8 g. of product A from isopropanol (seeding with product B) yielded the desired sample.

Ultra spectrum: only end absorption

Example 41.—Ethyl 5-Phenylpyrrolidine-2-Carboxylate

Ehtyl 2-phenylpyrrolidine-5-carboxylate (Ex. 2—21.7 g., 0.1 mole) was dissolved in 200 ml. 95% ethanol. Platinum oxide (0.5 g) was added and the solution was hydrogenated at 45 lbs. pressure and room temperature. The theoretical amount of hydrogen was consumed within one hour. At the end of two hours, the hydrogenation was stopped, the catalyst was removed by filtration and the ethanol was evaporated under reduced pressure. The remaining liquid was then distilled to yield 17.5 g. of a reaction product; B.P. 147–149°/4.6 mm. Redistillation yielded 8.7 g. of the desired compound; B.P. 95–97°/0.07 mm.; $n_D^{26}$ 1.5190.

Ultraviolet spectrum: only end absorption
Infrared spectrum (liq. film): 2.97, 5.76, 6.2, 6.7μ

Example 42.—5-Phenylpyrrolidine-2-Carboxamide (5-Phenylprolinamide)

2-phenylpyrroline-5-carboxamide (Ex. 3—11.2 g., 0.06 mole) was suspended in 150 ml. of 95% ethanol. Platinum oxide (0.2 g.) was added and the mixture was hydrogenated at 45 lbs. pressure and room temperature. The theoretical amount of hydrogen was consumed within two hours. At the end of this period the catalyst was removed by filtration and the solution was evaporated to dryness. The crystalline residue was recrystallized from 50 ml. of isopropanol and subsequently twice from 50 ml. of isopropanol-isopropyl ether (1:1) to give 4.0 g. of the desired product (M.P. 112–114°) in 35% yield. Ultraviolet spectrum: only end absorption.

Example 43.—Ethyl 5-(4-Hydroxyphenyl)Pyrrolidine-2-Carboxylate

Ethyl 2 - (4 - hydroxyphenyl)pyrroline-5-carboxylate (Ex. 5—11.7 g., 0.05 mole) was dissolved in 150 ml. of 95% alcohol. Platinum oxide (0.3 g.) was added and the mixture was hydrogenated at 3 atm. pressure and room temperature. After the uptake of 0.05 mole of hydrogen, the catalyst was removed by filtration and the solution was evaporated to small volume under reduced pressure. 10.4 g. of a reaction product (M.P. 115–116°) crystallized. Two recrystallizations from 20 ml. ethanol yielded 6.6 g. of the desired product; M.P. 114–115°.

Example 44.—5-(4-Chlorophenyl)Pyrrolidine-2-Carboxamide 5-(4-Chlorophenyl)Prolinamide 2-(4-chlorophenyl)pyrroline-5-carboxamide (Ex. 9—8.9 g., 0.04 mole) was suspended in 200 ml. of ethanol. Platinum oxide (0.2 g.) was added and the solution was hydrogenated at room temperature and 3 atm. pressure. The hydrogenation was completed within two hours. The catalyst was removed by filtration and the solution was evaporated to dryness under reduced pressure. Dissolution of the oily residue in 25 ml. of isopropanol led to crystallization of 7.0 g. of a reaction product (M.P. 129–134°). Three recrystallizations from isopropanol yielded 3.3 g. of the desired compound; M.P. 141–143°.

Example 45.—5-(4-Methoxyphenyl)Pyrrolidine-2-Carboxamide [5-(4-Methoxyphenyl)Prolinamide]

2-(4-methoxyphenyl)pyrroline-5-carboxamide (Ex. 11—10.7 g., 0.05 mole) was suspended in 200 ml. of ethanol. Platinum oxide (0.2 g.) was added and the solution was hydrogenated at room temperature and 3 atm. pressure. The hydrogenation was allowed to proceed for ten hours. The catalyst was then removed by filtration and the solution was evaporated to dryness under reduced pressure. Dissolution of the oily residue in 30 ml. of isopropanol led to crystallization of 7.6 g. of the reaction product; M.P. 92–93°. One further recrystallization from isopropanol yielded 5.4 g. of the desired compound; M.P. 92–93°.

Ultraviolet spectrum:

$$\lambda_{max.}^{MeOH}\ 225\ m\mu;\ \epsilon,\ 1.2 \times 10^4$$

Example 46.—5-(3,4-Dimethoxyphenyl)Pyrrolidine-2-Carboxamide [5-(3,4-Dimethoxyphenyl)Prolinamide] Hydrochloride 2-(3,4-dimethoxyphenyl)pyrroline-5-carboxamide (4.96 g., 0.02 mole) was dissolved in alcohol 2B (200 ml.). Platinum oxide (0.2 g.) was added and the solution was hydrogenated at 45 lbs. pressure and room temperature for four hours. The catalyst was removed by filtration and the ethanol was evaporated under reduced pressure. The resulting oil which could not be crystallized was dissolved in 10 ml. alcoholic HCl (0.095 mg./1 ml.). Immediate crystallization yielded the reaction product (4.45 g., M.P. 251–253° dec.). Two recrystallizations from methanol (ca. 100 ml.) gave 1.9 g. of the desired compound; MP. 254–256°.

Infrared spectrum: The hydrochloride salt shows IR bands at 1680 cm$^{-1}$ and 1730 cm$^{-1}$. The noncrystalline free base shows single carbonyl peak at 1680 cm$^{-1}$.

Ultraviolet spectrum:

$$\lambda_{max.}^{MeOH}\ 277\ m\mu\ (\epsilon,\ 3.3 \times 10^3),\ 230\ m\mu\ (\epsilon,\ 9.7 \times 10^3)$$

Example 47.—Methyl 1-Methyl-5-(3,4-Dimethoxyphenyl) Pyrrolidine-2-Carboxylate Hydrochloride (a) 1 - methyl - 2-(3,4-dimethoxyphenyl)-5-carbomethoxypyrrolinium iodide: A solution of methyl 2-(3,4-dimethoxyphenyl)pyrroline-5-carboxylate (10.5 g., 0.04 mole) and methyl iodide (56.4 g., 0.4 mole) in anhydrous benzene (100 ml.) was heated under reflux for 5 hours. The product which crystallized during reflux period was filtered off and washed with benzene; yield 12.6 g.; M.P. 164–166°.

Ultraviolet spectrum:

$$\lambda_{max.}^{MeOH}\ 240\ m\mu\ 297\ m\mu,\ 335\ m\mu$$

(b) Methyl 1-methyl-5-(3,4-dimethoxyphenyl)pyrrolidine-2-carboxylate hydrochloride: A suspension of the above compound (a) (37.0 g., 0.091 mole) in methanol (reagent, 200 ml.) was hydrogenated at room temperature and 3 atm. pressure for 2 hours in the presence of Adams catalyst (0.5 g.). The catalyst was removed by filtration and the resulting solution was evaporated to dryness. The resulting oil was dissolved in water (100 ml.); the solution was neutralized to pH 9 with saturated sodium carbonate solution and extracted with chloroform (3 x 150 ml.). The chloroform extract was washed with water, dried over sodium sulfate and evaporated to dryness to yield liquid (23.5 g.). This was diluted with isopropanol (60 ml.), ethanolic HCl (10 N, 10 ml.) was added and product crystallized (24.5 g., M.P. 182° dec.). Recrystallization from isopropanol (150 ml.) yielded colorless crystals (22.0 g., M.P. 182–193° dec.). Further recrystallization of a portion (5 g.) from isopropanol (30 ml.) yielded 4.2 g. of the desired compound; M.P. 182–183° dec.

Ultraviolet spectrum:

$$\lambda_{max.}^{MeOH}\ 275\ m\mu\ (\epsilon,\ 3,000);\ 225\ m\mu\ (\epsilon,\ 9,000)$$

Example 48.—1-Methyl-5-(3,4-Dimethoxyphenyl) Pyrrolidine-2-Carboxamide Hydrochloride Methyl 1-methyl-5-(3,4-dimethoxyphenyl)pyrrolidine-2-carboxylate hydrochloride (12.6 g., 0.04 mole) was dissolved in water (50 ml.). The solution was rendered alkaline (to pH 9) with saturated sodium carbonate solution and was extracted with chloroform (3 x 75 ml.). The chloroform extract was washed, dried over sodium sulfate and evaporated to dryness to yield an oil (11 g.). The crude product was dissolved in methanol (reagent, 100 ml.); the solution was saturated at ice bath temperature with ammonia and stored in a pressure bottle at room temperature for five days. The solution was evaporated to dryness, and the residue was crystallized from isopropanol (50 ml.) to yield the reaction product (10.4 g., M.P. 135–140°). Part of this (5.3 g., 0.02 mole) was dissolved in methanol (20 ml.) and ethanolic HCl (9.9 N, 3 ml.) was added. The hydrochloride salt crystallized on standing (5.1 g., M.P. 228–230° dec.). Recrystallization from methanol (20 ml.) yielded 3.0 g. of the desired compound; M.P. 231–233° dec.

Ultraviolet spectrum:

$\lambda_{max.}^{MeOH}$ 233 m$\mu$ ($\epsilon$, 10,000); 277 m$\mu$ ($\epsilon$, 3,300)

C. DICARBALKOXY AND DICARBOXAMIDO PYRROLINE DERIVATIVES

Example 49.—Diethyl 2-Phenylpyrroline-5,5-Dicarboxylate (a) Diethyl aminomalonate was prepared from diethyl malonate as described in Organic Syntheses 40, 21, 24 (1960); yield ca. 80%, B.P. 70–73°/0.2 mm.

(b) Diethyl carbobenzyloxyaminomalonate was prepared by the general procedure described by H. M. Kissman, et al., J. Am. Chem. Soc., 75, 1967 (1953); this method was found superior to the one reported by M. Frankel, et al., J. Am. Chem. Soc., 74, 3873 (1952). To a stirred refluxing solution of diethyl aminomalonate (131 g., 0.75 mole) in anhydrous benzene (1000 ml.) containing anhydrous potassium carbonate (1 mole, 138 g.) was added dropwise over a period of three hours benzyl chloroformate (K and K Labs., 119 g., 0.70 mole). Refluxing was continued for ½ to 1 hour after completed addition. The reaction mixture was filtered while hot and the inorganic precipitate was thoroughly washed with boiling benzene (3 x 100 ml.). The benzene was distilled off under reduced pressure and the residual oil was further dried at 125°/0.2 mm. to yield product (175 g., $n_D^{24°}$ 1.496) which solidified on standing. The crude product was identical to the product obtained after distillation (B.P. 155°/0.15 mm., $n_D^{26°}$ 1.495) and was used in the following Michael condensation without further purification.

(c) Diethyl (3-phenyl-3-oxopropyl)benzyloxycarbamidomalonate: 3-dimethylaminopropiophenone hydrochloride (40.0 g., 0.2 mole) was suspended in absolute ethanol (175 ml., dried by distillation over sodium and diethyl succinate), and dimethylsulfate (33.0 g., 0.24 mole) was added dropwise at room temperature. The reaction was allowed to proceed at room temperature for two hours with continuous stirring. Subsequent addition of diethyl benzyloxycarbamidomalonate (49.2 g., 0.16 mole) suspended in sodium ethoxide solution (prepared by dissolving 0.325 mole of sodium in 250 ml. of absolute ethanol) resulted in a slightly exothermic reaction. The mixture was stirred at room temperature for one hour, then heated under reflux for 3 hours, and again stirred at room temperature overnight. The reaction mixture was added to ice (1000 g.). A viscous mass formed first and then crystallized on standing; yield 69 g., M.P. 58–60°. Recrystallization from isopropanol yielded the reaction product (54 g., M.P. 68–69°).

(d) Diethyl 2-phenylpyrroline-5,5-dicarboxylate hydrobromide: The above compound (44 g., 0.1 mole) was dissolved in glacial acetic acid saturated with HBr (100 ml.). Reaction (as evidenced by effervescence) was allowed to proceed at room temperature for one hour. The solution was then evaporated to dryness under reduced pressure and the residue was crystallized from anhydrous ether (400 ml.) to yield a crystalline product (34.1 g., M.P. 150–152° dec.). Recrystallization from ethanol-ether (1:5, 400 ml.) yielded the desired compound (30.2 g., M.P. 155–157° dec.).

(e) Diethyl 2-phenylpyrroline-5,5-dicarboxylate: The above compound (d) (11.1 g., 0.03 mole) was dissolved in water (100 ml.). The solution was rendered basic to pH 8–9 with saturated sodium carbonate solution and extracted with chloroform (4 x 100 ml.). The chloroform extract was washed with water, dried over sodium sulfate and evaporated to dryness. The residue was crystallized from isopropyl ether to yield a crystalline product (8.0 g., M.P. 77–79°). Two recrystallizations from isopropyl ether gave the desired compound; M.P. 78–80°.

Ultraviolet absorption:

$\lambda_{max.}^{MeOH}$ 247 m$\mu$ ($\epsilon$, 18,000)

Example 50—2-Phenylpyrroline-5,5-Dicarboxamide

Diethyl 2-phenylpyrroline-5,5-dicarboxylate (7.25 g., 0.025 mole) was dissolved in ethanol (100 ml.). The solution was saturated with anhydrous ammonia in a pressure bottle at 0°. The solution was stored at room temperature for eleven days. The crystalline product (5.5 g., M.P. 243–245° dec.) was removed by filtration and was twice recrystallized from methanol (ca. 400 ml.) to yield the desired compound (3.9 g., M.P. 243–245° dec.).

Ultraviolet spectrum:

$\lambda_{max.}^{MeOH}$ 245 m$\mu$ ($\epsilon$, 14,500)

This application is a continuation-in-part of my application, Serial Number 160,638, filed December 19, 1961, now abandoned.

What is claimed is:

1. A compound selected from the group consisting of derivatives of pyrroline and pyrrolidine of the formulae:

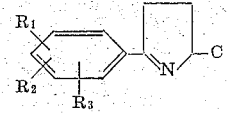 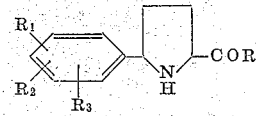

wherein

R is a member selected from the group consisting of hydroxy, lower alkoxy, lower aralkoxy, amino, hydrazino, lower alkylamino, di(lower)alkylamino, pyrrolidino, piperidino, morpholino, piperazino, 4-methylpiperazino and 4-phenylpiperazino;

$R_1$, $R_2$ and $R_3$ are chosen from the group consisting of hydrogen, chlorine, bromine, hydroxy, amino, lower alkyl, lower alkoxy and lower alkylenedioxy, and the pharmaceutically acceptable acid addition salts thereof.

2. 2-(4-chlorophenyl)pyrroline-5-carboxamide.
3. Methyl 2-(4-hydroxyphenyl)pyrroline - 5 - carboxylate.
4. 2-(3,4-dimethoxyphenyl)pyrroline-5-carboxamide.
5. 2-(3,4-methylenedioxyphenyl)pyrroline - 5 - carboxamide.
6. 2-(4-hydroxy-3-methoxyphenyl)pyrroline - 5 - carboxamide.
7. 2-(3,4-dimethoxyphenyl)-N-ethylpyrroline - 5 - carboxamide.
8. 2-(3,4-dimethoxyphenyl)pyrroline - 5 - [N-(2-dimethylaminoethyl)]carboxamide.
9. 2-(4-aminophenyl)pyrroline-5-carboxamide.
10. 1-[2-(3,4-dimethoxyphenyl)pyrroline - 5 - carbonyl]-4-phenylpiperazine.
11. 2-(3,4,5-trimethoxyphenyl)pyrroline - 5 - carboxamide.
12. 5-phenylpyrrolidine-2-carboxamide.
13. Ethyl 5-phenylpyrrolidine-2-carboxylate.
14. 5-(3,4-dimethoxyphenyl)pyrrolidine - 2 - carboxamide.

References Cited in the file of this patent

A. J. Crowle: "Tubercle," vol. 39, page 41 (1958).
Davey et al.: J. Chemical Society, Pt. 2, pages 2276–2282 (1958).
Sanno: "Chemical Abstracts," 53, page 5238 (1959).
Takahaski et al.: Chemical Abstracts, vol. 53, pages 21,540–21,941 (1959).
Gershon et al.: "J. Org. Chemistry," vol. 26, No. 7, pages 2347–50, July 1961.

UNITED STATES PATENT OFFICE
CERTIFICATE OF CORRECTION

Patent No. 3,164,597                                January 5, 1965

Frederick Leonard

It is hereby certified that error appears in the above numbered patent requiring correction and that the said Letters Patent should read as corrected below.

Column 1, line 44, for "$_{+1}C_mH_{2m}$" read -- $C_mH_{2m+1}$ --; column 6, line 75, before the spectral data insert -- Ultraviolet spectrum: --; column 11, line 24, for "($\epsilon$, 16,00); 270 m$\mu$ ($\epsilon$, 15,00);" read -- ($\epsilon$, 16,000); 270 m$\mu$ ($\epsilon$, 15,000); --; column 12, line 1, for "1:95" read -- 1:5 --; column 18, line 35, for "225" read -- 235 --; column 20, line 71, for "Ultra" read -- Ultraviolet --; column 22, line 52, for "182-193°" read -- 182-183° --.

Signed and sealed this 13th day of July 1965.

(SEAL)

Attest:

ERNEST W. SWIDER                              EDWARD J. BRENNER
Attesting Officer                                    Commissioner of Patents